Oct. 18, 1927.
E. S. BOCK
1,645,580
APPARATUS FOR MAKING LAMINATED GLASS
Filed Feb. 19, 1923    2 Sheets-Sheet 1
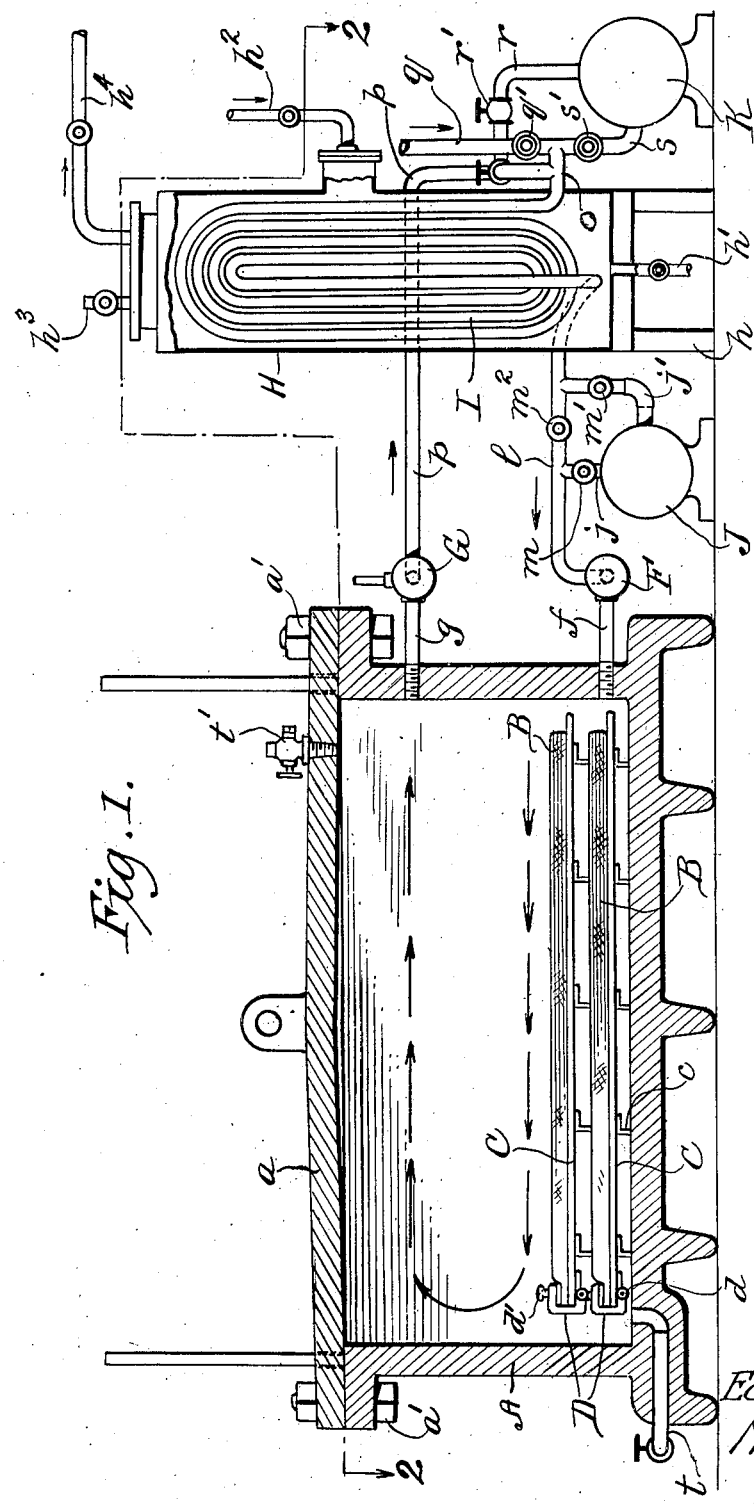
INVENTOR.
Edward S. Bock,
Attorney Oct. 18, 1927.
E. S. BOCK
1,645,580
APPARATUS FOR MAKING LAMINATED GLASS
Filed Feb. 19, 1923　　2 Sheets-Sheet 2
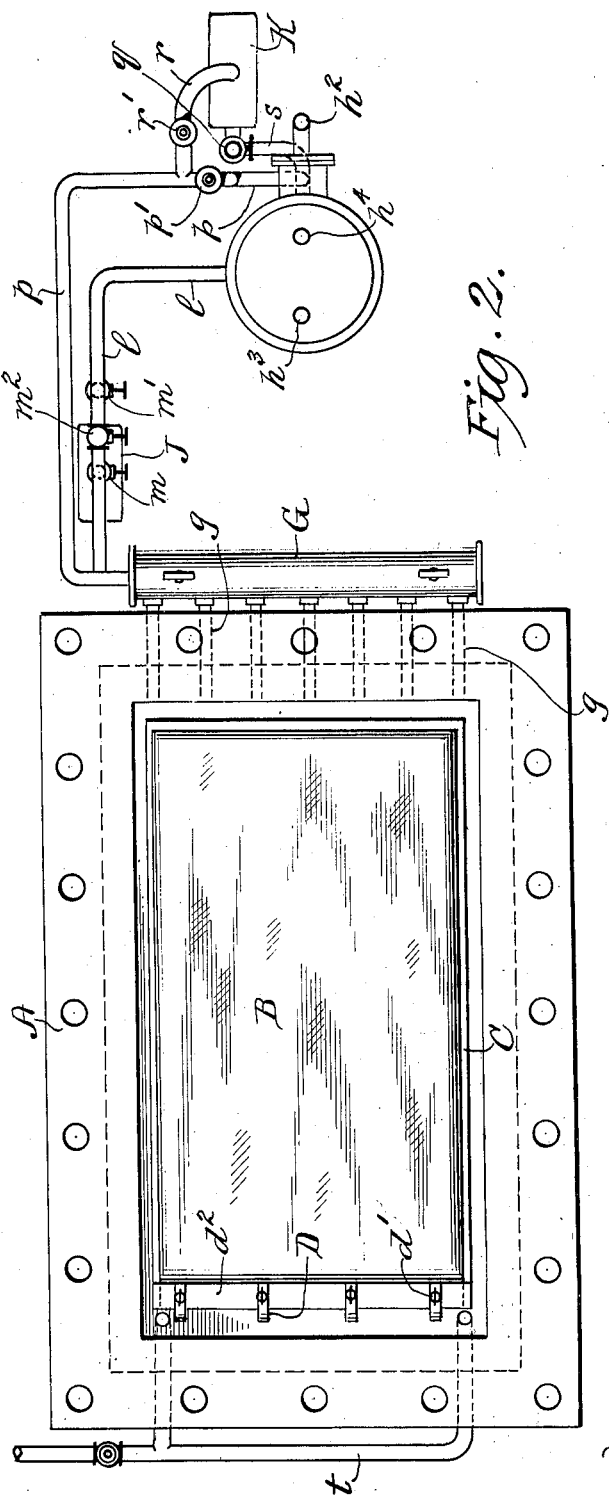
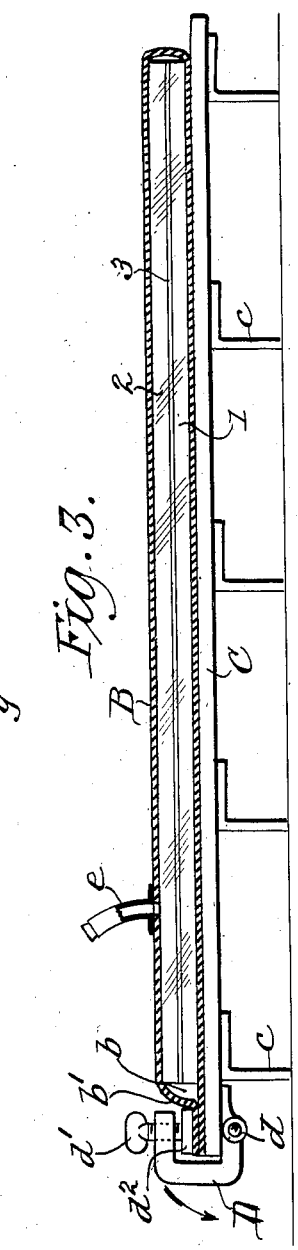
INVENTOR.
Edward S. Bock,
By N. J. Bernhard
Attorney.

Patented Oct. 18, 1927.

1,645,580

UNITED STATES PATENT OFFICE.

EDWARD S. BOCK, OF CROYDON, PENNSYLVANIA.

APPARATUS FOR MAKING LAMINATED GLASS.

Application filed February 19, 1923. Serial No. 619,863.

This invention is an apparatus for making laminated glass possessing non-shatterable and bullet proof qualities, and the object in view is to conduct the operations of uniting multiple sheets of glass under such conditions as will render plastic an interposed layer of celluloid, or analogous material, and will apply pressure to said glass sheets at successive stages, which operations are performed to the exclusion of air and are under the control of an attendant, with the result that the glass sheets are united intimately throughout the area thereof and by a medium which is transparent to such an extent that the ultimate product is clear glass.

Broadly stated, the invention embodies means for circulating liquid in a heated condition and at different pressures during successive stages and within a closed chamber within which is positioned a hermetically sealed container for a plurality of glass sheets with an interposed layer of adhesive, whereby heated liquid may be circulated for a required period of time to render plastic said adhesive layer and subsequently thereto the liquid is circulated under pressure so as to so act upon the container and the contents thereof as to effect the union of the glass sheets by the plastic interposed layer.

In a practical embodiment of the invention I employ a pressure chamber within which is deposited one or a plurality of the containers composed of flexible material and provided with means for exhausting air therefrom and with means for hermetically sealing said container subsequently to the operation of placing therein a plurality of glass sheets between which is interposed a layer of material, such as celluloid, the whole being confined within said container to the substantial exclusion of air. Co-operating with said pressure chamber is a service pump and a liquid heating means whereby the liquid may be recirculated as required between and within the pressure chamber and the heating means. In addition to said heating means and the service pump, the apparatus is equipped with a high pressure pump so connected that it performs the function of circulating the liquid in a heated condition and at relatively high pressure within the pressure chamber. Means are provided for by-passing the liquid with respect to the service pump when the high pressure pump is acting, and in like manner means are provided for cutting the high pressure pump out of use when the service pump is in use.

Other functions and advantages of the invention will appear from the following description taken in connection with the drawings, wherein—

Figure 1 is a vertical sectional view partly in elevation illustrating an apparatus for making laminated glass embodying my invention.

Figure 2 is a plan view of the apparatus with the cover removed from the pressure chamber.

Figure 3 is an enlarged view in longitudinal section, partly in elevation, of the flexible sealed contained and the platform therefor for holding the multiple sheets of glass to be united in accordance with this invention.

A pressure chamber A, of substantial formation to withstand the pressure of the fluid adapted to be circulated therein, is provided with a removable head or cover $a$, the same being fastened securely and removably in position by a number of bolts $a'$.

Within this chamber are adapted to be deposited one or more containers B for the multiple glass sheets to be united in a manner to produce laminated glass in accordance with the invention. Each container is shown as a vessel or receptacle composed of flexible material, such as rubber, said container comprising a seamless rubber bag with an open mouth, $b$, adapted to be closed by a flap, $b'$, in a manner to seal the container against the ingress of air. With each container is associated a platform or base C, composed of rigid material, such as metal, and provided with means for securely closing flap $b'$ over the mouth of said container. Said platform or base is shown as a metal plate provided on its under side with stiffening ribs, $c$, in the form of angle irons, attached fixedly to the base and depending therefrom, to serve as supporting and spacing means for the base and the flexible container adapted to be imposed thereon.

Associated with said base and the container is a clamping device of one form or another, said clamping device performing the functions of means for closing and sealing the mouth of the container, and as a means for retaining the container and its contents in a fixed relation to the platform or base, so as to preclude displacement of said container relatively to the platform in the operations of carrying the base and its load to and from the pressure chamber, or of depositing the base and the container within the pressure chamber, or of removing the same from said chamber. As shown, the clamping device comprises yoke shaped parts D, having a pivotal connection at $d$ with the under side of the base, at one end portion thereof, a plurality of binding screws $d'$ supported in the yoke shaped parts at the free ends thereof, and a plate or bar $d^2$ adapted to be imposed upon the container flap $b'$ and to be forcibly held by the screws $d'$ into contact with the flap $b'$.

Each container is adapted for the reception of the components of the resulting product, and in one example (non-shatterable glass) of the invention, two sheets of glass and a thin sheet of adhesive are used for the production of such non-shatterable glass, although it is to be understood that the invention is not restricted to the production of non-shatterable glass embodying two sheets, for the reason that I may use three or more sheets of glass with a corresponding increase in the numbers of adhesive layers, or cores, so as to produce bullet proof glass. The glass sheets are each coated on one surface thereof with a film of a material or composition adapted to be united, blended or amalgamated with a thin layer of celluloid or analogous material, the glass sheets being indicated at 1, 2, and the thin celluloid at 3 in Figure 3 of the drawings. The celluloid layer is positioned between the coated surfaces of the glass sheets, and the assembled components are inserted within the container, through the open mouth $b$ thereof. Said container and its contents are placed upon the base C with the open mouth of the container adjacent the yoke shaped parts D. The flap $b'$ having been closed over the mouth of the container, into the position shown in Figure 3, the yokes are swung upwardly and over said flap $b'$, so that the clamping rail or bar may rest upon the flap, whereupon the screws $d'$ are tightened against the rail, for the purpose of tightly and securely closing the mouth of the container.

Means are provided for exhausting air from the container in order to house the components of the laminated glass in vacuo. To this end, the flexible container B is provided with a nipple, $e$, adjacent the flap $b'$ thereof, and to this nipple is adapted to be connected appropriate means for exhausting air from the interior of the container. The prepared container with the glass components and substantially free from air as described, or a number of the same, are deposited within the pressure chamber, together with their corresponding platforms, and where more than one container and platform is used, the containers and their platforms are stacked or piled one upon the other and within the pressure chamber, two being shown in Figure 1.

F and G are manifolds or headers positioned adjacent one end of the pressure chamber, one above the other. The intake manifold is in a horizontal position near the bottom of the chamber exteriorly thereto, and said manifold F is connected by a series of branch pipes, $f$, with said pressure chamber, a number of the branch pipes being used in order to tranquilize the flow of the liquid from the manifold into the chamber. The outlet manifold, G, is exteriorly of the chamber, adjacent the upper part thereof, and the chamber A and manifold G are connected by a separate series of branch pipes, $g$. These manifolds constitute elements of a closed liquid circuit which includes a heater, H, a coil, I, a service pump, J, and a high pressure pump, K, with suitable or appropriate connections whereby either pump J or K may be brought into operation to the exclusion of the other pump.

As shown, the heater H is a closed tank supported in a vertical position on an appropriate stand, $h$, and from the bottom of this tank leads a valved pipe, $h'$, for draining liquid from the tank when found necessary or desirable.

Suitable means are provided for supplying a heating medium to the chamber H, and in the drawings I have shown a steam pipe $h^2$ connected to the chamber, although other heating media may be utilized. The heater is equipped with suitable accessories, such as a relief valve $h^3$ and a valve-controlled air vent $h^4$; but accessories other than those mentioned may be supplied as required.

The coil I is positioned within the steam chamber of heater H, and this coil is in the closed liquid circuit. To one end of the coil is connected a feed pipe, $l$, the other end of which is connected to the intake header, F, and co-operating with said feed pipe is the service pump J with branch connections, $j$, $j'$, between the feed pipe and the pump to serve as a by-pass, valves $m$, $m'$, $m^2$, being provided in the pipe $l$ and branches $j$, $j'$, to control the direction of flow of the liquid. With valve $m^2$ closed and valves $m$, $m'$ opened, pump J takes its supply from coil I through pipe $l$ into header F, and thence through branches $f$ into the pressure chamber; but with valves $m$, $m'$ closed and valve $m^2$ opened, the service pump and by-pass are cut out of the circuit, whereby provision is made for the circulation of liquid at increased pressure by the action of pump K, the circulation of liquid at such increased pressure flowing through pipe $l$ without entering the service pump J.

The end of the water coil opposite to the feed pipe $l$ is extended to produce an intake branch $o$, to which is connected a return pipe $p$, having the stop cock $p'$, the other end of which pipe is coupled to the return manifold G, thus providing for the return flow of water from pressure chamber A to the coil I. A water supply pipe $q$ is coupled with the intake branch $o$, said pipe having a stop cock $q'$.

The pump K for circulating liquid at increased pressure is of greater capacity than the service pump, each pump being of any desired construction to serve the required functions. The high pressure pump is provided with an intake pipe $r$ which is connected to the return pipe $p$, a suitable valve $r'$ being provided in said intake pipe $r$. The outlet for pump K is a pipe $s$ connected to the branch $o$ of the water coil, said pipe $s$ being provided with a stop cock $s'$. With valves $r'$, $s'$, closed, the pump K is cut out of communication with the liquid circuit, and with the valves $m$, $m'$ open and valve $m^2$ closed, the pump J operates to circulate water through the coil I and chamber A. Steam being supplied to the chamber H, the water flowing through coil I is heated to the temperature required, and with the pump J acting to effect the circulation, hot water circulates from the heater to the pressure chamber and back again, for a required period, from about twenty (20) to thirty (30) minutes. The water is heated to a required temperature, about 235° Fahr., when thin sheets of celluloid (pyroxylin) are used as the cores between the glass sheets, and by supplying water at approximately this temperature, the cores or layers are softened and rendered plastic, the hot water supplied to chamber A circulating around the flexible containers B, and between the separated platforms, C, so that the heat of the water is communicated to the containers, the glass sheets therein, and the celluloid cores or layers.

The operation is as follows: The glass sheets are washed thoroughly to remove surface adhesions, and dried to eliminate all surface moisture, whereupon one surface of each sheet is coated with a material or a composition in solution to produce thereon a film which adheres firmly to the surface of the glass sheet. As this film producing agent, I prefer to use a solution of gelatin, 10 per cent, amyl acetate, 40 per cent, and acetone, 50 per cent; although the particular solution may be modified as to its components and as to the proportions. The films having dried on the surfaces of the sheets, two or more of the sheets are assembled with their film covered surfaces in opposing relation, and between these coated surfaces there is interposed a thin core or sheet, 3, of celluloid, or equivalent material, it being preferred to use transparent celluloid with a thickness of about .002 of an inch, although the character and thickness of the core may be modified. The glass sheets and core having been assembled in register, the assembled components are introduced into a flexible container B, the latter placed upon a platform C, the flap $b'$ closed, and the clamp adjusted to securely close the container, after which the nipple $l$ is connected with an exhauster for exhausting air from the container so that the components of the product are within a flexible container to the exclusion of air. One or more of the containers and platforms are placed within the pressure chamber, being stacked therein as in Figure 1, the cover $a$ is fitted and securely clamped, and steam supplied to heater H. The water is thus heated and pump J being in service, the hot water is circulated between the heater and the pressure chamber for a period of time required to soften and render plastic the celluloid cores between, and the films on the surface of, the plurality of glass sheets. Hot water having been circulated for the required period, the pump J is cut out of service by closing valves $m$, $m'$ and opening valve $m^2$, and the other pump K is brought into service by opening valves $r'$ $s'$, whereupon the pump K becomes effective in circulating the water at an increased pressure, the water flowing through the closed liquid circuit which includes the pipes $l$, $p$, headers F, G, and coil I with the several connections shown and described. The water being heated to the required temperature and the water being circulated at the required pressure, such heat and pressure are communicated to the components of the product confined to the exclusion of air within the flexible containers B, the result of which is to forcibly press together the sheets of glass 1, 2, and to compress the same upon the interposed celluloid core, 3, whereby the plastic core and the films on the surfaces of the glass are united, welded or amalgamated in a manner to secure a permanent union of the glass sheets and result in a product of clear glass capable of resisting shocks, blows, the impact of projectiles, and, should a fracture take place, no fragments will be set free to result in injury to bystanders. The circulation of hot water at the required pressure having been continued for a proper time, the pump K is stopped, and cover $a$ removed from the tank, whereupon the containers and their attached platforms are lifted out of the tank, the containers are opened, and the laminated glass removed from said containers.

It should be stated that the pressure chamber A is equipped with a suitable valved drain $t$ for discharging the water when required to a suitable pit or sewer, and, further, that said chamber is equipped, also, with a relief valve, $t'$, a pressure gage, a temperature gage, and such other accessories as may be required. The process of making laminated glass disclosed in this application forms the subject-matter of a separate application Serial No. 619,864, filed by me on even date herewith.

Having thus fully described the invention, what I claim as new and desire to secure by Letters Patent is:

1. In an apparatus for producing laminated glass, a pressure chamber, a flexible unitary non-metallic container, and a substantially rigid platform upon which the container is supported, said platform being substantially coextensive with the unitary container and said platform being insertible as a unit with the container into the pressure chamber.

2. In an apparatus for producing laminated glass, a pressure chamber, a flexible unitary non-metallic container, a substantially rigid platform upon which is imposed said container, and means for fixedly clamping the container to said platform, said container and platform being insertible as a unit within the pressure chamber.

3. In an apparatus for producing laminated glass, a pressure chamber, a flexible unitary non-metallic container provided with an exhaust connection and with means for closing the mouth thereof, a substantially rigid platform upon which the container is imposed, and means for tightly closing said mouth of the container, said platform and the container being insertible into and removable from the chamber as a unit.

4. In an apparatus for producing laminated glass, a substantially rigid platform, a non-metallic flexible container separate from the platform and adapted to rest thereupon, and means for retaining the container in a fixed relation to said platform.

5. In an apparatus for producing laminated glass, a substantially rigid platform, a non-metallic flexible container separate from the platform and adapted to rest thereupon, said container having means unitary therewith for closing the mouth of the container, and means co-operating with the platform and the container closing means for tightly closing the mouth of the container.

6. In an apparatus for producing laminated glass, a substantially rigid platform, a flexible container adapted to be imposed thereon, said container being provided with a closure for the mouth thereof, and clamping means co-operating with the platform and with the mouth closure for effecting a fixed attachment of the container to the platform and for securely closing the mouth of said container.

7. In an apparatus of the character described, a bodily flexible container, separate supporting means therefor, means for exhausting the air therefrom, said container having a flap end, and means for securely closing the flap end to hermetically seal the container.

8. In an apparatus for producing laminated glass, a hollow unitary container composed of flexible material and open at one end, said container being provided with a flap movable to close the open end, combined with a platform upon which the hollow container is imposed, and means operating to clamp the flap relatively to the container and to retain the container fixedly upon the platform.

9. In an apparatus for producing laminated glass, a hollow unitary container composed of flexible material, a supporting platform upon which the container is imposed, and means for retaining the container in fixed relation to the platform, combined with a pressure chamber into which the container and platform is adapted to be inserted as a unit, and means for circulating fluid under pressure within said pressure chamber.

In testimony whereof I have hereto signed my name this 5th day of February, 1923.

EDWARD S. BOCK.